United States Patent Office 3,265,662
Patented August 9, 1966

3,265,662
MODIFIED HIGH PURITY 2,2-BIS(2,3-EPOXY-PROPOXYPHENYL) PROPANE
Harry O. Kirwan and Harold C. Klassen, Louisville, Ky., assignors, by mesne assignments, to Celanese Coatings Company, a corporation of Delaware
No Drawing. Filed July 30, 1962, Ser. No. 213,109
6 Claims. (Cl. 260—47)

This invention, in one of its aspects, relates to modified high purity 2,2-bis(2,3-epoxypropoxyphenyl) propane. In another of its aspects, the invention relates to high purity 2,2-bis(2,3-epoxypropoxyphenyl) propane inhibited against crystallization.

It has recently been found that the substantially pure diglycidyl ether of bisphenol A is capable of existing in crystalline form, and that it can be recovered in the form of free-flowing crystals. A free-flowing solid is one which exists in the form of discrete relatively small particles. Free-flowing solids can be readily poured from a container. The substantially pure crystalline 2,2-bis (2,3-epoxypropoxyphenyl) propane is greatly superior in a number of ways to the less pure form of the compound known heretofore. The crystalline product has substantially better color, higher epoxy content, lower chlorine content, and lower phenolic hydroxide content. The high purity diglycidyl ether of bisphenol A is generally characterized by a melting point of 43.5° C., an epoxide equivalent of 170, a total chlorine content of less than 0.1 percent by weight and a phenolic hydroxide content of less than 0.01 gram equivalents per 100 grams.

Crystalline diglycidyl ethers of bisphenol A are very suitable for use in adhesives, moldings, pottings, surface protection, and in laminations. They are particularly superior in electrical properties. In such systems, crystalline products can be combined with curing agents used with conventional or commercial epoxide resins to produce compositions for these end uses. While there are many advantages in using the pure epoxy resin, there are, nevertheless, certain disadvantages in the use of the high purity crystalline diglycidyl ether of bisphenol A. In the main, these disadvantages are attributable to the low melting point of the high purity diglycidyl ether. When this substantially pure diglycidyl ether is purified by distillation, the distillate is withdrawn from the still at a temperature above the 43.5° C. melting point. The distillate is, therefore, a liquid, but it will solidify as it cools to a temperature below the melting point. One of the disadvantages, then, is that if the product is to be made by a procedure involving purification by distillation, additional steps must be taken to produce crystals from the cooled, solid distillate. Another disadvantage of the invention is encountered during the use of free-flowing crystals obtained through purification by recrystallization. While free-flowing crystals are obtained from selective solvents, these crystals will fuse together under certain conditions, particularly during storage. The user is then faced with a vessel containing a solid epoxide resin.

In accordance with this invention, it has been discovered that crystallization of high purity 2,2-bis(2,3-epoxypropoxyphenyl) propane can be prevented if the purified diglycidyl ether is reacted with very small quantities of anhydrides, or a primary or secondary aromatic amine curing agent. A B-stage gel is a state, known to those skilled in the epoxy resin art, which results from the partial reaction of a curing agent with an epoxide resin. For example, as described in U.S. 2,801,229, an amine curing agent and an epoxide resin are reacted until a fusible resinified product is formed. The curing of the product is then arrested before it becomes infusible. The resulting B-stage gel then can more easily be used in its later curing application. In the preparation of B-stage gel, therefore, the curing agent is used with the glycidyl polyether in an amount sufficient to cure the glycidyl polyether during subsequent processing. These curing quantities, however, are 15 or more times the amount of amine or anhydride employed in the practice of this invention.

In referring to amounts of ingredients added to epoxide resins, the conventional measurement is in parts by weight per 100 parts of resin, "phr." Proportions of various curing agents required to cure with epoxide resins are known in the art and can be found in various publications, and "a curing amount of a curing agent has a definite meaning to the worker skilled in this art." Since curing agents are generally reacted with the epoxide resin in stoichiometric amounts, a curing amount is normally in the range 10 to 50 phr., depending upon the molecular weight of the curing agent.

In accordance with the practice of this invention, an amount of the curing agent sufficient to inhibit crystallization, but insufficient to cause gelation, is employed. Only 0.5 to 2, preferably .5 to 1, phr. are used in the reaction with the high purity diglycidyl ether of bisphenol A. Such being the case, it is clear that the composition of this invention is essentially the high purity glycidyl polyether rather than a B-stage gel.

Further differentiating the compositions of this invention from B-stage gels is the fact that these compositions will not cure without the further addition of a curing agent. The small amount of amine or anhydride, 0.75 to 2 phr., used in this invention is not sufficient either to gel the resin or to appreciably alter the physical properties of the resin other than to prevent crystallization. The reaction of the inhibiting amount of the curing agent and the substantially pure crystalline glycidyl polyether is carried out at a temperature of at least the melting point of the glycidyl polyether, and generally below 180° C. If the curing agent and the glycidyl polyether are both in the liquid state, that is, if the glycidyl polyether has not yet crystallized, the two are nevertheless heated to the melting point of the crystalline glycidyl polyether. It is best to incorporate the curing agent in the melted, crystallizable, resin. However, the two can be pre-mixed. Preparation of the modified high purity glycidyl polyethers can best be described by reference to the following examples.

*Example 1*

To a one liter flask was added 500 gms. of the crystalline diglycidyl ether of bisphenol A (epoxide equivalent 171, percent Cl<0.1, M.P. 43° C.). Heat was applied to melt the crystalline material. At 50° C., after complete melting, 3.75 gm. m-phenylene diamine (0.75 phr.) was added. Heating was continued until the temperature reached 150° C. This temperature was held until a constant viscosity was attained, Gardner-Holdt $Z_5$–$Z_6$, the total time at 150° C. being three hours. The epoxide equivalent of the resulting resin was 178.8. This material had not crystallized after one month at room temperature. The viscosity and the epoxide equivalent remained constant over this period, both at room temperature and at 60° C., indicating no continued reaction of the epoxide groups and the amine.

A second portion of crystalline glycidyl polyether, when similarly melted but without the addition of a curing agent, crystallized overnight to a solid mass in its container.

*Example 2*

To a ten liter flask equipped as above was added 6000 gms. of purified diglycidyl ether of bisphenol A and 42.5 gms. (.70 phr.) m-phenylene diamine. Heat was applied to raise the temperature to 150° C. This temperature was held for three hours and forty minutes until a constant viscosity, $Z_5-Z_6$, was attained. The resulting resin at this stage had an epoxide equivalent of 178.3. The resin showed no indication of crystal formation after ten weeks at room temperature. No change was noted in the epoxide equivalent after ten weeks either at room temperature or at 140° F., although the viscosity had increased slightly to $Z_6$.

*Example 3*

To a two liter flask equipped as described before was added 1000 gms. of purified diglycidyl ether of bisphenol A and 7.5 gms. (.75 phr.) methyl nadic anhydride. The temperature was raised to 150° C. and held for four hours and forty minutes until a constant viscosity of P–Q was obtained. The epoxide equivalent was 171.7. After two weeks at room temperature, no crystal formation was noted. No change occurred in the epoxide equivalent or viscosity over this period either at room temperature or at 60° C.

While meta phenylene diamine is perhaps the most desirable curing agent, included are any of the well known primary and secondary aromatic amine curing agents, that is, those having at least one amino hydrogen atom. Among the amines employed as curing agents are primary and secondary aromatic monoamines, that is, amines having only one $NH_2$ or NHR group, for example, aniline, toluidine, xylidine and the like. Also used are polyamines, including diamines, i.e., amines having two or more primary or secondary amino groups on separate carbon atoms, for example, the other phenylene diamines, metaxylylene diamine, metatolylene diamine, methylene dianiline, and the like. Higher melting solid polyamines such as diaminodiphenylsulfone, triaminotriphenylmethane, and 9,9-bis-(3-aminopropyl) fluorene can be used to advantage in this invention.

The polybasic acid anhydrides used in preparing the resin compositions of this invention contain one or more anhydride groups. The polybasic acid anhydride curing agents which are well known and used herein include both aliphatic and aromatic polycarboxylic anhydrides, either saturated or unsaturated, for example, succinic, adipic, maleic, tricarballyic, phthalic, pyromellitic anhydrides. Endo-cis-bicyclo-(2,2,1) - 5 - heptene-2,3-dicarboxylic anhydride (sold under the trademark "Nadic" anhydride), 1,4,5,6,7,7 - hexachlorobicyclo - (2,2,1)-5-heptene-2,3-dicarboxylic anhydride (sold under the trademark "Chlorendic" anhydride) are also desirable. Preferred polybasic acid anhydrides are the anhydrides of dicarboxylic acids, preferably phthalic acid anhydride. The acid anhydrides, which are produced by diene syntheses, can also be used. Other known polybasic acid anhydrides, which can also be used in this invention, are anhydrides of glutaric, sebacic, isosuccinic, tetrahydrophthalic, naphthalene-dicarboxylic, diglycolic, hemimellitic trimellitic acids. Such desirable anhydride curing agents are described in U.S. 2,947,717 which is incorporated herein by reference.

While the discussion of the high purity glycidyl ether of this invention has been limited to mixtures of the polyepoxide with curing agents, it is obvious that fillers, pigments, and the like can be employed where indicated by the end use. Other such modifications and variations will occur to those skilled in the art.

What is claimed is:

1. As a new composition of matter, a modified high purity diglycidyl ether of bisphenol comprising the reaction product of substantially pure crystallizable 2,2-bis (2,3-epoxypropoxyphenyl) propane with 0.5 to 2 parts per 100 parts diglycidyl ether of a curing agent selected from the group consisting of primary and secondary aromatic amines and polybasic acid anhydrides in an amount sufficient to inhibit crystallization, but insufficient to cure the composition without the use of additional curing agent.

2. As a new composition of matter, a modified high purity diglycidyl ether of bisphenol comprising the reaction product of crystallizable 2,2-bis(2,3-epoxypropoxyphenyl) propane with 0.5 to 1 part per 100 parts of meta phenylene diamine.

3. As a new composition of matter, a modified high purity diglycidyl ether of bisphenol comprising the reaction product of crystallizable 2,2-bis(2,3-epoxypropoxyphenyl) propane with 0.5 to 1 part per 100 parts of methyl nadic anhydride.

4. A process for inhibiting the crystallization of substantially pure 2,2-bis(2,3-epoxypropoxyphenyl) propane which comprises reacting said 2,2-bis(2,3-epoxypropoxyphenyl) propane with a curing agent selected from the group consisting of primary and secondary aromatic amines and polybasic acid anhydrides in an amount sufficient to inhibit crystallization, but insufficient to cure the composition without the use of additional curing agent.

5. The process of claim 4 wherein the curing agent is a dicarboxylic acid anhydride.

6. The process of claim 4 wherein the curing agent is a primary aromatic amine.

References Cited by the Examiner

UNITED STATES PATENTS 2,801,229    7/1957    De Hoff et al. _____ 260—2
3,095,429    6/1963    Smith et al. _____ 260—348

OTHER REFERENCES

Lee et al.: Epoxy Resins, McGraw-Hill Book Co., Inc., New York (1957) (pp. 18, 52 and 57 relied on).

SAMUEL H. BLECH, *Primary Examiner.*

NICHOLAS S. RIZZO, *Examiner.*

J. P. FRIEDENSON, *Assistant Examiner.*